US007601798B2

(12) United States Patent
Zhao et al.

(10) Patent No.: US 7,601,798 B2
(45) Date of Patent: *Oct. 13, 2009

(54) METHODS OF PREPARING POLYMERS HAVING TERMINAL AMINE GROUPS USING PROTECTED AMINE SALTS

(75) Inventors: Hong Zhao, Edison, NJ (US); Belen Rubio, Somerset, NJ (US)

(73) Assignee: Enzon Pharmaceuticals, Inc., Bridgewater, NJ (US)

( * ) Notice: Subject to any disclaimer, the term of this patent is extended or adjusted under 35 U.S.C. 154(b) by 570 days.

This patent is subject to a terminal disclaimer.

(21) Appl. No.: 11/242,656

(22) Filed: Oct. 4, 2005

(65) Prior Publication Data
US 2007/0078257 A1    Apr. 5, 2007

(51) Int. Cl.
C08F 6/06    (2006.01)
C08F 6/10    (2006.01)
C08G 73/00    (2006.01)

(52) U.S. Cl. ............... 528/422; 528/486; 525/54.1; 525/403

(58) Field of Classification Search ............ 528/422, 528/486; 525/54.1, 403
See application file for complete search history.

(56) References Cited

U.S. PATENT DOCUMENTS

| 4,179,337 | A | 12/1979 | Davis et al. |
| 5,206,344 | A | 4/1993 | Katre et al. |
| 6,448,369 | B1 | 9/2002 | Bentley et al. |
| 6,828,401 | B2 | 12/2004 | Nho et al. |
| 2003/0149307 | A1 | 8/2003 | Hai et al. |

OTHER PUBLICATIONS

Zalipsky, S., et al., Eur. Polym. J. vol. 19 pp. 1177-1183, 1983.
Mutter, M., Tetrahedron Lett., pp. 2839-2842, 1978.
Renil, M., et al., J.Peptide Sci., pp. 195-210, 1998.
Mongondry, P., Macromol. Rapid Commun., vol. 24, pp. 681-685, 1998.
Yinglin, H., Synth. Commun., vol. 21, pp. 79-84, 1991.
Pal, B., Synth. Commun., vo.. 34, pp. 1317-1323, 2004.
Ragnarsson, U., Acc. Chem. Res., vol. 24, pp. 285-289, 1991.

Primary Examiner—Duc Truong
(74) Attorney, Agent, or Firm—Lucas & Mercanti, LLP

(57) ABSTRACT

The present invention is directed to methods of preparing linear polymers such as polyalkylene oxides containing a terminal amine in high purity. One preferred method includes reacting a polyalkylene oxide such as polyethylene glycol containing a terminal tosylate with a protected amine salt to form a polymer containing a terminal protected amine and thereafter deprotecting the polymer containing the terminal protected amine to form the polymer having a terminal amine. The resultant polymer-amines are of sufficient purity so that expensive and time consuming purification steps required for pharmaceutical grade polymers are avoided.

22 Claims, No Drawings

METHODS OF PREPARING POLYMERS HAVING TERMINAL AMINE GROUPS USING PROTECTED AMINE SALTS

FIELD OF THE INVENTION

The present invention relates to methods of preparing activated polymers such as polyalkylene oxides. In particular, the invention relates to methods of preparing linear polymers containing a terminal amine in high purity.

BACKGROUND OF THE INVENTION

The conjugation of water-soluble polyalkylene oxides with therapeutic moieties such as proteins and polypeptides is known. See, for example, U.S. Pat. No. 4,179,337, the disclosure of which is hereby incorporated by reference. The '337 patent discloses that physiologically active polypeptides modified with PEG circulate for extended periods in vivo, and have reduced immunogenicity and antigenicity.

To conjugate polyalkylene oxides, the hydroxyl end-groups of the polymer must first be converted into reactive functional groups. This process is frequently referred to as "activation" and the product is called an "activated polyalkylene oxide." Other polymers are similarly activated.

Amine terminated polymers such as PEG-$NH_2$ are known. See Zalipsky et al. Eur. Polym. J. Vol. 19 No. 12., pp 1177-1183. They can be used "as is" for direct conjugation to COOH groups found on some biologically active compounds. More often, PEG-$NH_2$ (or PEG-amine) is used as an intermediate which is further functionalized when other polymeric delivery systems are desired. For example, certain polymer-based drug delivery platform systems containing benzyl elimination systems, trimethyl lock systems, etc. can include PEG-$NH_2$ as a key intermediate in the process of synthesis. See Greenwald et al. J. Med. Chem. Vol. 42, No. 18, 3657-3667; Greenwald et al. J. Med. Chem. Vol. 47, No. 3, 726-734; Greenwald et al. J. Med. Chem. Vol. 43, No. 3, 475-487. The contents of each of the foregoing are hereby incorporated herein by reference.

PEG-amines are also useful for conjugation (via reductive amination) with biologically active small molecules and polypeptides having available aldehyde groups. See also Nektar Advanced PEGylation catalog 2005-2006, page 24, the contents of which are incorporated herein by reference.

In the past, it was generally known that PEG-amines could be prepared by preparing the PEG-halide, mesylate or tosylate from PEG-OH and thereafter performing a nucleophilic displacement reaction with aqueous ammonia (Hoffmann Reaction), sodium azide or potassium phthalimide (Gabriel Reagent). The reaction of the PEG-halide with the ammonia forms the PEG-amine directly. More importantly, a major disadvantage is that a significant percentage of PEG-halide becomes hydrolyzed to form PEG-OH during the concentrated aqueous ammonia treatment. This is a particular concern when forming higher molecular weight PEG-amines. The higher molecular weight PEG, the more PEG-OH is formed. For example, in the case of $PEG_{5,000}$ the amount is about 5% and with higher molecular weight PEG such as $PEG_{40,000}$ the amount can be up to 20%. Consequently, the purity of the desired end product can decrease considerably.

Even when PEG-azide is used as the intermediate to make the PEG-amine, certain shortcomings have been observed when metal catalyzed hydrogenation is used. Furthermore, reaction with potassium phthalimide provides a basically protected amine that is deprotected with hydrazine in ethanol under reflux. This too is associated with drawbacks. The harsh conditions required for removal of the phthaloyl group and the need for intensive purification of the final product add significantly to the cost of the desired product.

In view of the foregoing, it would be desirable to provide improved methods for preparing PEG-amines and related polymers having terminal amines which address the shortcomings and drawbacks of the prior art. The present invention addresses this need.

SUMMARY OF THE INVENTION

In one preferred aspect of the invention, there are provided improved methods of preparing polymers having terminal amines. The methods include reacting a substantially non-antigenic polymer of the formula (I)

$$R_3—R_2—R_1 \qquad (I)$$

wherein $R_1$ is a reactive polymer terminal group such as a leaving group;

$R_2$ is a substantially non-antigenic polymer; and $R_3$ is a capping group or $R_1$;

with a protected amine salt to form a polymer containing a terminal protected amine; and thereafter reacting the polymer containing the terminal protected amine resulting therefrom with an acid to remove the protecting group and form the polymer having a terminal amine.

Examples of preferred reactive polymer terminal groups include leaving groups such as tosylate, mesylate, brosylate, tresylate, nosylate, Br, Cl, etc.

The reaction of the polymer of Formula (I) with the protected amine salt is preferably carried out in a solvent such as dimethylformamide and the reactants are reacted under reactions conditions and for a time which are sufficient to substantially complete each of the reaction steps which ultimately causes formation of the terminal amine on the polymer. In more preferred aspects of the invention, the polymer which is converted to the amine derivative is a PEG-tosylate and the tosylate group can be on at least one or more of the terminals of the PEG.

In an alternative aspect of the invention, the preferred protected amine salt is the potassium salt of methyl-tert-butyl imidodicarbonate (KNMeBoc) or the potassium salt of di-tert-butyl imidodicarbonate ($KNBoc_2$).

The purity of the polymer containing the terminal amine formed by process described herein is greater than about 95%, preferably greater than 98% and more preferably greater than 99%.

One of the chief advantages of the present invention is that the resulting terminal amine-containing polymers such as polyalkylene oxide derivatives thereof are prepared in high purity. Thus, product contaminants, namely, the starting materials, such as mPEG-OH are not found in appreciable amounts, that is, they are found in amounts of less than about 5%, preferably less than about 2% and most preferably less than about 1%. When the preferred PEG-amines are more economically formed in high purity, the artisan can make end products which incorporate the PEG-amine more efficiently and at lower cost. The reaction to make the PEG-amine can be forced to completion and the excess small molecule reagents can be removed by recrystallization. The efficiencies result, in part, because the separation of the desired amine-terminated polymer from the starting alcohol or reactive intermediate (e.g. tosylate) is not required. Furthermore, tedious column or ion exchange or HPLC techniques are not required to provide the desired PEG-amine. Thus, the present invention provides highly pure PEG-amine without costly column purification.

Another advantage is the fact that the amine made from the processes described herein will not change the backbone of the PEG at all. Therefore it will be compatible with all current and future applications for PEG amines.

DETAILED DESCRIPTION OF THE INVENTION

The methods of the invention relate generally to the formation of polymers containing at least one terminal amine thereon. In most aspects of the invention, the polymers which can be modified using the processes described herein are substantially non-antigenic polymers. Within this genus of polymers, polyalkylene oxides are preferred and polyethylene glycols (PEG) are most preferred. For purposes of ease of description rather than limitation, the process is sometimes described using PEG as the prototypical polymer. It should be understood, however, that the process is applicable to a wide variety of polymers which can be linear, substantially linear, branched, etc. One of the only requirements is that the polymer contains the means for covalently attaching the desired reactive polymer terminal group thereon and can withstand the processing required to transform the tosyl or other intermediate to the amine under the conditions described herein.

In accordance with the foregoing, one preferred aspect of the invention for preparing a polymer having a terminal amine, includes:

a) reacting a substantially non-antigenic polymer of the formula (I)

$$R_3\text{—}R_2\text{—}R_1 \quad\quad (I)$$

wherein
  $R_1$ is a reactive polymer terminal group
  $R_2$ is a substantially non-antigenic polymer; and
  $R_3$ is a capping group or $R_1$;
with a protected amine salt to form a polymer containing a terminal protected amine; and b) reacting the polymer containing the terminal protected amine resulting therefrom with an acid to remove the protecting group and form the polymer having a terminal amine.

For purposes of the present invention, it will be understood that the term "reactive polymer terminal group" when used in context with $R_1$ means a leaving group such as those known in the relevant art. A non-limiting list of suitable leaving groups includes tosylate, mesylate, brosylate, tresylate, nosylate, Br, Cl, etc.

As stated above, in one embodiment, $R_3$ can be a capping group. For purposes of the present invention, capping groups shall be understood to mean a group which is found on the terminal of the polymer. In some aspects, it can be selected from any of $CO_2H$, $C_{1-6}$ alkyls ($CH_3$ preferred), OH, etc. or other terminal groups as they are understood by those of ordinary skill.

$R_2$ is also preferably a polymer that is water soluble at room temperature such as a polyalkylene oxide (PAO) and more preferably a polyethylene glycol such as mPEG or bis-activated PEG. A non-limiting list of such polymers therefore includes polyalkylene oxide homopolymers such as polyethylene glycol (PEG) or polypropylene glycols, polyoxyethylenated polyols, copolymers thereof and block copolymers thereof, provided that the water solubility of the block copolymers is maintained.

For purposes of illustration and not limitation, the polyethylene glycol (PEG) residue portion of $R_2$ can be selected from among:

—$CH_2CH_2$—O—$(CH_2CH_2O)_x$—$CH_2CH_2$— and
—S—$CH_2CH_2$—O—$(CH_2CH_2O)_x$—$CH_2CH_2S$— wherein:
  x is the degree of polymerization, i.e. from about 10 to about 2,300

In alternative aspects of the invention, when bis-activated polymers are desired, $R_3$ is the same as $R_1$, and the resultant reactant is used in making bis-amine-terminated polymer compounds. Such bis-activated polymers can be of formula (Ia):

$$R_1\text{—}CH_2CH_2\text{—}O\text{—}(CH_2CH_2O)_x\text{—}CH_2CH_2\text{—}R_1 \quad\quad (Ia)$$

wherein $R_1$ is preferably tosylate and x is the same as above.

The degree of polymerization for the polymer represents the number of repeating units in the polymer chain and is dependent on the molecular weight of the polymer. Although substantially non-antigenic polymers, PAO's and PEG's can vary substantially in weight average molecular weight, preferably, $R_2$ has a weight average molecular weight of from about 200 to about 100,000 Da in most aspects of the invention. More preferably, the substantially non-antigenic polymer has a weight average molecular weight from about 2,000 to about 48,000 Daltons.

$R_2$ can also be a "star-PEG" or multi-armed PEG's such as those described in Shearwater Corporation's 2001 catalog "Polyethylene Glycol and Derivatives for Biomedical Application", the disclosure of which is incorporated herein by reference.

In yet another preferred embodiment, $R_2$ is part of a branched polymer corresponding to the polymers of the invention. Specifically, $R_2$ can be of the formula:

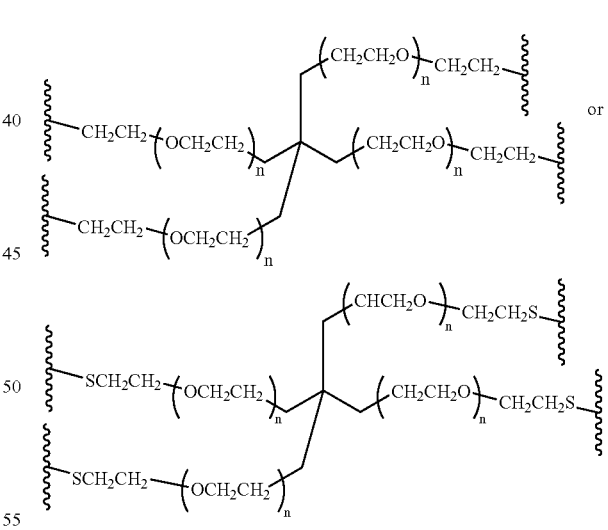

wherein:
  n is an integer from about 10 to about 340, to preferably provide polymers having a total molecular weight of from about 12,000 to about 40,000; and at least 1, but up to 3, of the terminal portion a of the residue is/are capped with a methyl or other lower alkyl and the remaining terminal group(s) is/are $R_3$ groups(s). See also the aforementioned Nektar catalog, page 26 "4-arm PEG." Such compounds prior to terminal amination preferably include:

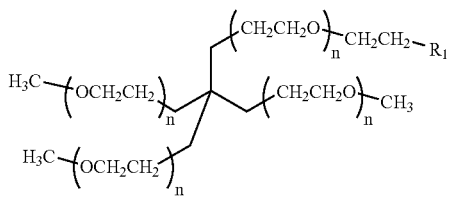

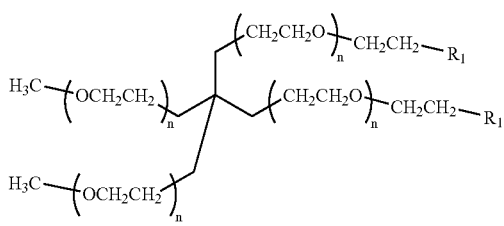

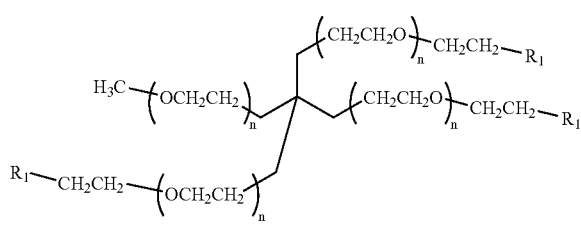

wherein $R_1$ is

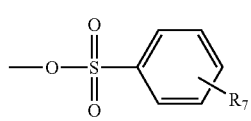

where $R_7$ is preferably methyl and all other variables are as previously defined herein. One specific polymer capable of undergoing the amination process described herein is:

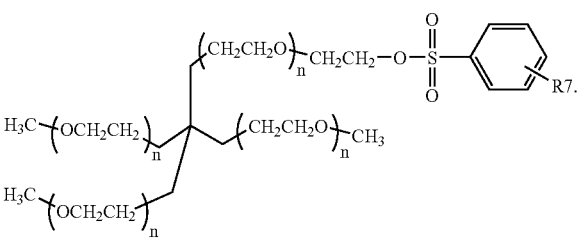

Other aspects of this embodiment of course would have one or two of the terminal methyl groups replaced by tosyl groups so as to correspond with $R_1$ above.

Also contemplated within the scope of the invention, is the formation of a terminal amine on various other PEG-based compounds, including those branched polymer residues described in commonly assigned U.S. Pat. Nos. 5,605,976, 5,643,575, 5,919,455 and 6,113,906, the disclosure of each being incorporated herein by reference. A representative list of some specific compounds includes:

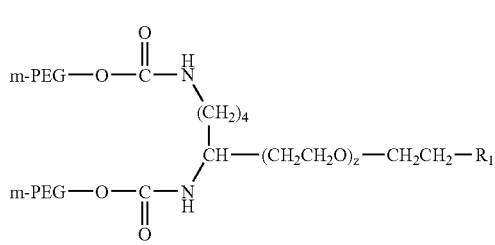

(1a)

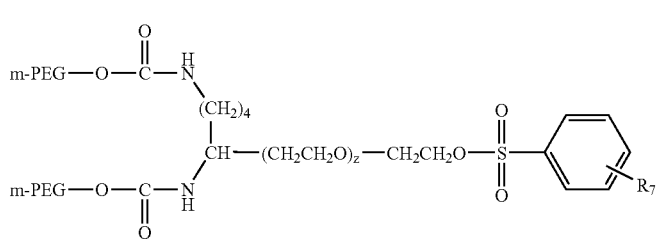

(1b)

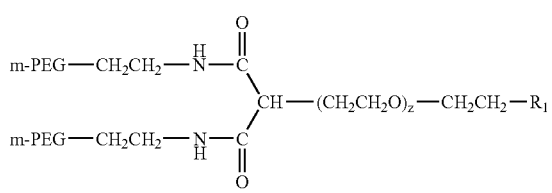

(2a)

-continued

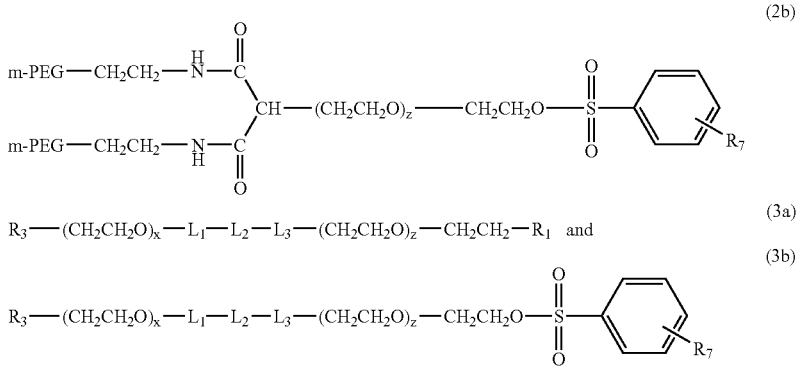

wherein
R$_7$ is preferably methyl;
z is an integer from 1 to about 120;
L$_1$ and L$_3$ are independently selected bifunctional linking groups such as one of the following non-limiting compounds:

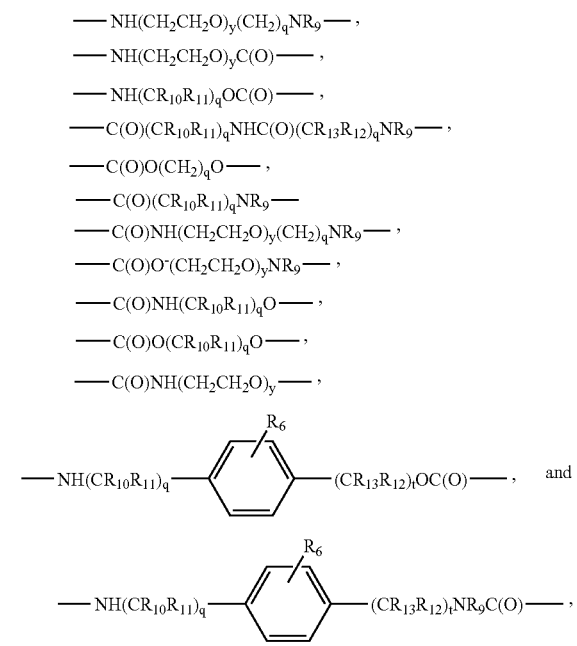

wherein
R$_{9-13}$ are independently selected from the same group as that which defines R$_4$ above, and preferably H or CH$_3$;
R$_6$ is selected from the same group as that which defines R$_4$, NO$_2$, C$_{1-6}$ haloalkyl and halogen; and
q, t and y are each independently selected positive integers such as from 1 to about 12; and L$_2$ is a branched linking group such as a diamino alkyl or lysine residue. See, for example, the aforementioned U.S. Pat. No. 6,113,906, for example.

In a further embodiment, and as an alternative to PAO-based polymers, R$_2$ is optionally selected from among one or more effectively non-antigenic materials such as dextran, polyvinyl alcohols, carbohydrate-based polymers, hydroxypropylmethacryl-amide (HPMA), polyalkylene oxides, and/or copolymers thereof. See also commonly-assigned U.S. Pat. No. 6,153,655, the contents of which are incorporated herein by reference. It will be understood by those of ordinary skill that the same type of activation is employed as described herein as for PAO's such as PEG. Those of ordinary skill in the art will further realize that the foregoing list is merely illustrative and that all polymeric materials having the qualities described herein are contemplated.

It will also be understood that any of the water-soluble polymers described herein can be functionalized for attachment to the R$_3$ group(s), e.g. tosylate, mesylate, if required without undue experimentation prior to amination. Conversion or activation of the polymer (e.g. PEG) terminal OH into a tosylate, etc. has been reported in the art. See, for example U.S. Pat. No. 5,206344 and U.S. Patent Application Pub. No. 2003/0149307, the contents of each of which are incorporated herein by reference.

In accordance with the methods of the present invention, the formation of the polymer containing a terminal protected amine calls for reacting a substantially non-antigenic polymer of formula (I) containing one or more R$_1$ groups e.g. reactive polymer terminal groups such as a tosylate, mesylate, brosylate, tresylate, nosylate, Br or Cl, with a protected amine salt. The reaction is carried out in a suitable solvent such as and without limitation dimethylformamide (DMF), tetrahydrofuran (THF), dimethylacetamide or similar reagents and mixtures thereof. The preferred solvent is dimethylformamide (DMF). As will be appreciated by those of ordinary skill, there are a number of other suitable solvents which can be used in the process of the present invention. Suitable solvents include those which are polar solvents such as methanol, ethanol, butanol, isopropanol, dioxane, etc. This step can be carried out at about room temperature although temperatures can range from about 0° C. to the reflux or boiling point of the solvent.

A wide variety of protected amine salts can be used in the processes of the invention. Generally, the protected amine salts can correspond to the formula:

MNP$_1$R$_4$ wherein
M is hydrogen or a metal chosen from lithium, sodium and potassium;
P$_1$ is included but not limited to the following list C(O)H, C(O)OMe, C(O)OBzl (Z), C(O)OtBu (Boc), C(O)OCH$_2$CCl$_3$ (Troc), P(O)(OEt)$_2$, CPh$_3$ (trityl); and
R$_4$ is P$_1$ or for example, C$_{1-6}$alkyls, C$_{3-12}$ branched alkyls, C$_{3-8}$ cycloalkyls, C$_{1-6}$ substituted alkyls, C$_{3-8}$ substituted cycloalkyls, aryls, substituted aryls, aralkyls, C$_{1-6}$ heteroalkyls, substituted C$_{1-6}$ heteroalkyls, C$_{1-6}$ alkoxy, phenoxy and C$_{1-6}$ heteroalkoxy, etc.

Within the above group of possible reagents, a non-limiting list of some preferred suitable reagents includes without limitation, the potassium salt of di-tert-butyl imidodicarbonate (KNBoc$_2$), the lithium salt of di-tert-butyl imidodicarbonate (LiNBoc$_2$), the sodium salt of di-tert-butyl imidodicarbonate, etc. In one preferred aspect of the invention, the protected amine salt is the potassium salt of di-tert-butyl imidodicarbonate (KNBoc$_2$).

In alternative aspects of the above-described aspect of the invention, the protected amine salt can be selected from among potassium, sodium and lithium salts of NR$_4$Boc, wherein R$_4$ is as shown above, for example, C$_{1-6}$ alkyls, etc. and Boc is t-butylcarbonate.

Within many aspects of the invention, the preferred protected amine salt is the potassium salt of methyl-t-butyl imidodicarbonate (KNMeBoc).

After the polymer containing the protected amine is formed, the protecting group, (e.g. Boc) is removed via hydrolyzing as mentioned above to for the desired PEG-amine derivatives in high purity. Non-Boc-protecting groups are removed using other art-recognized techniques.

The high purity PEG-amine can then be used in any art-recognized way. For example, and without limitation, it can be used for direct conjugation with CO$_2$H groups or other suitable reactive groups found on biologically active targets of interest using techniques well known to those of ordinary skill. Alternatively, the PEG-amine can be used as a highly pure intermediate in more complex polymer linking systems such as the aforementioned benzyl-elimination (RNL) platforms or even as part of PEG-liposome systems. For the sake of illustration, the RNL systems can be made by reacting the PEG-amine with a suitable protected benzyl alcohol followed by deprotection and activation using techniques known to those of ordinary skill. See also the last example below.

After the polymer containing the terminal protected amine is formed, the polymer is deprotected, i.e. the protecting group is removed, in order to form the desired amine-terminated polymer. The deprotecting can be accomplished using -an acid such as and without limitation, HCl solution in Et$_2$O (ether) or dioxane, acetic acid, dichloroacetic acid, formic acid, and trifluoroacetic acid in dichloromethane (or dichloroethane) (from 15% to 35%), or other solvent compatible to dissolve the acid and allow deprotection under organic environment. In many aspects of the invention, 20% trifluoroacetic acid in dichloromethane is preferred.

The methods of the present invention are preferably carried out using at least about an equimolar amount of the reactants. More preferably, the protected amine salt is present in a molar excess with respect to the compound of formula (I). Preferably, the protected amine salt is present in at least about a 3-5 fold molar excess to the mPEG is about 5 to about 1. When delta-PEG (bis-PEG or activated on each terminal) is used, the molar excess is about twice as high, e.g. about a 6-10 fold molar excess. Similar ratios are used per amine group to be added if branched polymers are used. It will be understood that when terminally branched polymers are used, the molar excess of protected amine salt preferably used is at least equal to the number of reactive terminal polymer moieties (e.g. tosylate, etc.) found on the polymer.

In many aspects of the invention, a polyalkylene oxide (PAO) such as uncapped PEG-OH (di-PEG OH) or mPEG is converted into a compound of formula (IIa) or (IIb):

In many aspects of the invention, a polyalkylene oxide (PAO) such as uncapped PEG-OH (di-PEG OH) or mPEG is converted into a compound of formula (IIa) or (IIb):

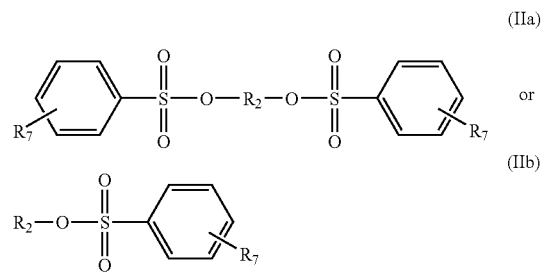

wherein

R$_2$ is a PAO such as PEG or mPEG; and

R$_7$ is for example a methyl, halogen, nitro, fluoromethyl, difluoromethyl, trifluromethyl, and substituted carboxyl. CH$_3$ is preferred.

After the polymer containing the protected amine is formed, the protecting group, (e.g. Boc) is removed via hydrolyzing as mentioned above to for the desired PEG-amine derivatives in high purity.

The high purity PEG-amine can then be used in any art-recognized way. For example, and without limitation, it can be used

EXAMPLES

The following examples serve to provide further appreciation of the invention but are not meant in any way to restrict the effective scope of the invention.

Example 1

$^{40KDa}$bis-PEG amine

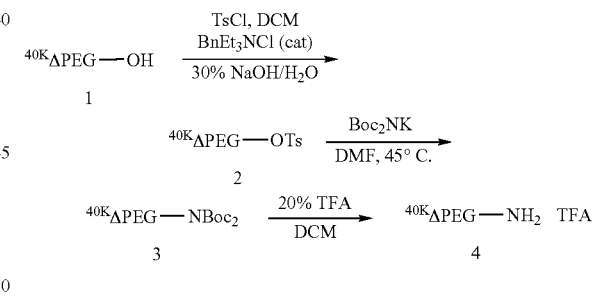

a) PEG-tosylate (PEG-OTs). To a solution of $^{40KDa}$ΔPEG-OH (100 g, 2.5 mmoles, 1 eq) in 800 mL of DCM were added 400 mL of a 30% aqueous NaOH solution and BnEt$_3$NCl (228 mg, 1.0 mmol, 0.2 eq). Then, to the vigorously stirred mixture a solution of p-toluenesulfonyl chloride (2.86 g, 15 mmol, 3 eq) in 500 mL of DCM was added dropwise via addition funnel over 2 hours, and the reaction mixture was stirred at room temperature overnight. After addition of 500 mL of DCM and 200 mL of a saturated NaCl solution, the organic phase was separated and washed twice with 200 mL of a saturated NaCl solution. The organic phase was dried over anhydrous MgSO$_4$, filtered and evaporated under vacuum to give a solid that was dissolved in a minimum amount of DCM and precipitated with ethyl ether. Filtration provided 97 g of $^{40KDa}$ΔPEG-OTs (96% yield). $^{13}$C NMR: 21.57, 68.47, 69.07, 70.21-71.75 (PEG), 127.68, 129.55, 132.69, 144.44.

b) PEG-NBoc$_2$. To a solution of $^{40KDa}\Delta$PEG-OTs (96 g, 2.38 mmol, 1 eq) in 500 mL anhydrous DMF was added Boc$_2$NK (3.65 g, 14.28 mmol, 3 eq). The reaction mixture was heated to 45° C. overnight. After cooling to room temperature, 1.2 L of ethyl ether was added. The resulting solid was filtered and washed with plenty of ether The crude solid was dissolved in 1.2 L of DCM and washed twice with 200 mL of a saturated NaCl solution. The organic layer was dried over MgSO$_4$, filtered and evaporated under vacuum. The resulting solid was recrystallized with DCM/ethyl ether to give 90 g of $^{40KDa}\Delta$PEG-NBoc$_2$ (94% yield). $^{13}$C NMR (ppm): 27.93, 45.01, 69.05, 69.68-70.34 (PEG), 81.94, 152.20.

c) PEG-amine salt (PEG-NH$_2$.TFA). To a solution of $^{40KDa}\Delta$-PEG-NBoc$_2$ (90 g, 2.23 mmol) in 900 mL DCM was added 225 mL of TFA. The reaction mixture was stirred at room temperature for 4 hours and then evaporated under vacuum. The resulting solid was dissolved in 300 mL of DCM and precipitated by addition of 2 L of ethyl ether. After filtration the solid was recrystallized again with DCM/ethyl ether to give 88 g of $^{40KDa}\Delta$PEG-NH$_2$.TFA (98% yield). $^{13}$C NMR (ppm): 39.87, 66.77, 69.71-70.72 (PEG).

Example 2

$^{20KDa}$bis-PEG-amine

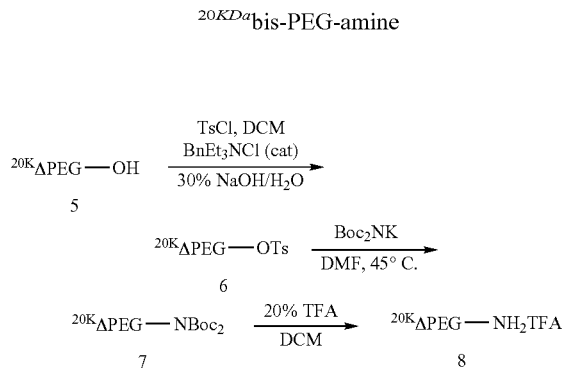

The corresponding $^{20KDa}\Delta$PEG-amine is made from $^{20KDa}\Delta$PEG-OTs prepared in the same way above except that PEG 20 KDa is used in place of PEG 40 KDa.

Compound 6 is made under the same conditions of 2 in Example 1. The structure of 6 is confirmed by NMR.

Compound 7 is made under the same conditions of 3 in Example 1. The structure of 7 is confirmed by NMR.

Compound 8 is made under the same conditions of 4 in Example 1. The structure of 8 is confirmed by NMR.

Example 3

$^{40KDa}$bis-PEG-N-methylamine

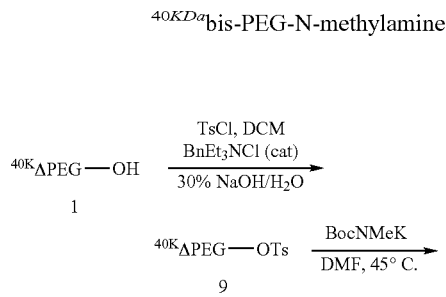

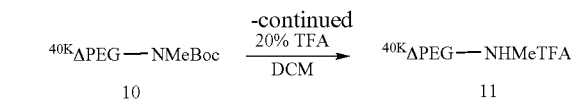

a) PEG-tosylate (PEG-OTs). The procedure of Example 1 is repeated.

b) PEG-NMeBoc. Compound 10 is made under the same conditions as in example 1 except that an equivalent amount of BocMeNK is used instead of BOc$_2$NK. The structure of 10 is confirmed by NMR.

c) PEG-N-methylamine (PEG-NHMe). Compound 11 is made under the same conditions as in Example 1 except that an equal amount of compound 10 is used instead of compound 3. Structure is confirmed by NMR.

Example 4

$^{30KDa}$mPEG-amine

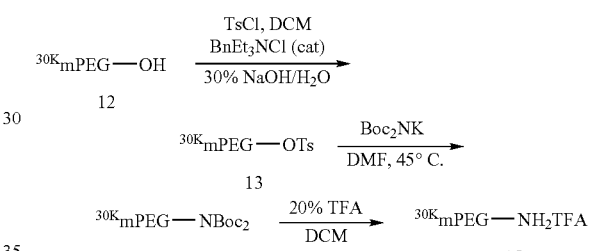

a) $^{30KDa}$mPEG-tosylate ($^{30KDa}$mPEG-OTs). To a solution of $^{30KDa}$mPEG-OH (85 g, 2.83 mmoles, 1 eq) in 800 mL of DCM were added 400 mL of a 30% aqueous NaOH solution and BnEt$_3$NCl (257 mg, 1.13 mmol, 0.4 eq). Then, to the vigorously stirred mixture a solution of p-toluenesulfonyl chloride (1.62 g, 8.49 mmol, 3 eq) in 600 mL of DCM was added dropwise via addition funnel over 2 hours, and the reaction mixture was stirred at room temperature overnight. After addition of 800 mL of DCM and 200 mL of a saturated NaCl solution, the organic phase was separated and washed twice with 200 mL of a saturated NaCl solution. The organic phase was dried over anhydrous MgSO$_4$, filtered and evaporated under vacuum to give a solid that was dissolved in a minimum amount of DCM and precipitated with ethyl ether. Filtration provided 80 g of $^{30KDa}$mPEG-OTs (94% yield). $^{13}$C NMR: 21.57, 58.83, 68.41, 69.07, 69-69-72.95 (PEG), 127.62, 129.52, 132.68, 144.40.

b) $^{30KDa}$mPEG-NBoc$_2$. To a solution of $^{30KDa}$mPEG-OTs (78 g, 2.59 mmol, 1 eq) in 800 mL anhydrous DMF was added Boc$_2$NK (1.99 g, 7.8 mmol, 3 eq). The reaction mixture was heated to 45° C. overnight. After cooling to room temperature, 3 L of ethyl ether was added. The resulting solid was filtered and washed with plenty of ether. The crude solid was dissolved in 1.2 L of DCM and washed twice with 200 mL of a saturated NaCl solution. The organic layer was dried over MgSO$_4$, filtered and evaporated under vacuum. The resulting solid was recrystallized with DCM/ethyl ether to give 67 g of $^{30KDa}$mPEG-NBoc$_2$ (86% yield). $^{13}$C NMR (ppm): 27.93, 45.01, 58.83, 69.04, 69.66-71.70 (PEG), 81.94, 152.20.

c) $^{30KDa}$mPEG-amine salt ($^{30KDa}$mPEG-NH$_2$.TFA). To a solution of $^{30KDa}$mPEG-NBoc$_2$ (67 g, 2.22 mmol) in 670 mL DCM was added 335 mL of TFA. The reaction mixture was stirred at room temperature for 4 hours and then evaporated under vacuum. The resulting solid was dissolved in 300 mL of DCM and precipitated by addition of 2 L of ethyl ether. After filtration the solid was recrystallized again with DCM/ethyl ether to give 64 g of $^{30KDa}$mPEG-NH$_2$.TFA (98% yield). $^{13}$C NMR (ppm): 39.81, 58.83, 66.90, 69.63-71.70 (PEG).

Examples 5-8

The process of Examples 1-4 are repeated except that the corresponding PEG-Cl derivative is used in place of the tosylate in equimolar amounts.

Example 9

$^{30KDa}$mPEG RNL 9 linker

In this example, the $^{30KDa}$mPEG-NH$_2$ of Example 4 is converted into the activated PEG linker according to the following reaction scheme.

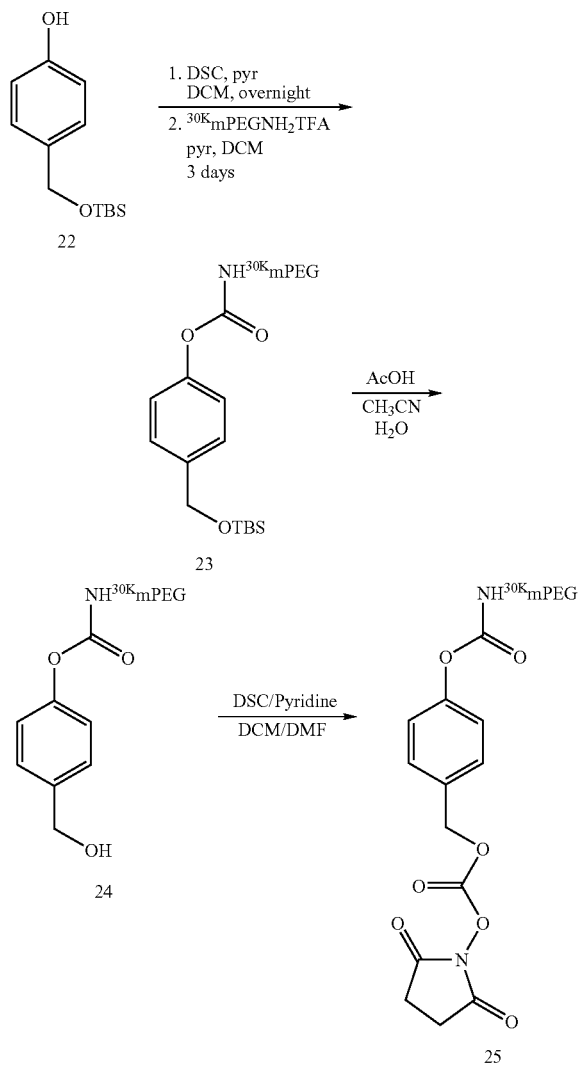

a) $^{30KDa}$mPEG RNL9 OTBDMS 23. To a solution of alcohol, 22 (238 mg, 1 mmol, 6 eq) in anhydrous CH$_3$Cl were added DSC (235 mg, 0.92 mmol, and 5.5 eq) and pyridine (88 µL, 1.08 mmol, 6.5 eq). The resulting suspension was heated to reflux overnight, cooled to room temperature and added to a solution of $^{30KDa}$mPEG-NH$_2$.TFA (hereinafter 21) (5 g, 0.17 mmol, 1 eq) and pyridine (17 µL, 0.21 mmol, 1.25 eq) in 25 mL of anhydrous CH$_3$Cl. After stirring at room temperature for 3 days, the solvent was evaporated under vacuum. The resulting solid was dissolved in the minimum amount of dichloromethane and then, precipitated by addition of ether, filtered and recrystallized with CH$_3$CN/IPA to give 4.85 g (94% yield). GPC: 98.39%. $^{13}$C NMR (75.4 MHz, CDCl$_3$) δ 154.47, 149.59, 137.90, 126.52, 121.02, 69.09-71.65 (PEG), 64.24, 58.83, 40.83, 25.84, 18.27, 5.28.

b) $^{30KDa}$mPEG RNL9OH 24. To a solution of 23 (4.85 g, 0.16 mmol) in 20 mL CH$_3$CN and 10 mL of water was added 50 mL of glacial acetic acid. The reaction mixture was stirred at room temperature overnight and then, evaporated under vacuum. The residue was dissolved in 75 mL CH$_2$Cl$_2$. The organic phase was washed twice with 15 mL of water, dried over MgSO$_4$, filtered and evaporated under vacuum. The resulting solid was dissolved in the minimum amount of CH$_2$Cl$_2$ and then, precipitated by addition of ether to give 4.49 g (94% yield). GPC: 98.35%. $^{13}$C NMR (75.4 MHz, CDCl$_3$)δ 154.36, 149.90, 138.18, 127.37, 121.15, 69.42-71.69 (PEG), 63.93, 58.80, 40.83.

c) $^{30KDa}$mPEG RNL9NHS 25. To a solution of 24 (4.49 g, 0.15 mmol, 1 eq) in 50 mL anhydrous CH$_2$Cl$_2$ and 5 mL anhydrous DMF was added DSC (305 mg, 1.19 mmol, 8 eq). The mixture was cooled to 0° C. and then, pyridine (87 µL, 1.07 mmol, 7.2 eq) was added. The reaction mixture was stirred at room temperature overnight and then, evaporated under vacuum. The resulting solid was dissolved in the minimum amount of CH$_2$Cl$_2$ and then, precipitated by addition of ether, filtered and recrystallized with CH$_3$CN/IPA to give 4.26 g (94% yield). GPC: 97.04%. $^{13}$C NMR (75.4 MHz, CDCl$_3$)δ 168.33, 154.01, 151.51, 151.22, 129.80, 129.53, 121.68, 69.88-73.08 (PEG), 58.83, 40.89, 25.32.

The final product can be used for conjugation to any number of biologically active polypeptides, enzymes, proteins, small molecules, etc. having an available amine or hydroxyl thereon for conjugation. The procedures for such conjugation reactions have been described, for example, in commonly-assigned U.S. Pat. No. 6,180,095, the contents of which are incorporated herein by reference, or the aforementioned Greenwald et al. J. Med. Chem. Vol. 42, No. 18, 3657-3667.

What is claimed is:

1. A method of preparing a polymer having a terminal amine, comprising:
    a) reacting a substantially non-antigenic polymer of the formula (I)

$$R_3—R_2—R_1 \qquad (I)$$

wherein
    $R_1$ is a reactive polymer terminal group;
    $R_2$ is a substantially non-antigenic polymer; and
    $R_3$ is a capping group or $R_1$; with a protected amine salt to form a polymer containing a terminal protected amine; and
    b) reacting the polymer containing the terminal protected amine resulting from step a) with an acid to remove the protecting group and form the polymer having a terminal amine.

2. The method of claim 1, wherein $R_1$ is a leaving group selected from the group consisting of tosylate, mesylate, brosylate, tresylate, nosylate, Br and Cl.

3. The method of claim 1, wherein the reacting step a) is carried out in a solvent selected from the group consisting of dimethylformamide (DMF), tetrahydrofuran (THE), dimethylacetamide and mixtures thereof.

4. The method of claim 2, wherein the leaving group is tosylate.

5. The method of claim 1, wherein the protected amine salt is selected from the group consisting of the potassium salt of di-tert-butyl imidodicarbonate ($KNBoc_2$), the lithium salt of di-tert-butyl imidodicarbonate ($LiNBoc_2$), and the sodium salt of di-tert-butyl imidodicarbonate.

6. The method of claim 5, wherein the protected amine salt is the potassium salt of di-tert-butyl imidodicarbonate (KNBoc2).

7. The method of claim 1, wherein the protected amine salt is selected from the group consisting of the potassium, sodium and lithium salts of $NR_4Boc$, wherein $R_4$ is selected from the group consisting of hydrogen, $C_{1-6}$ alkyls, $C_{3-12}$ branched alkyls, $C_8$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy and $C_{1-6}$ heteroalkoxy; and Boc is t-butylcarbonate.

8. The method of claim 7, wherein the protected amine salt is the potassium salt of methyl-tert-butyl imidodicarbonate (KNMeBoc).

9. The method of claim 1, wherein the acid used to remove said protecting group is selected from the group consisting of hydrochloric acid, acetic acid, dichloroacetic acid, formic acid, and trifluoroacetic acid.

10. The method of claim 9, wherein the acid is trifluoroacetic acid.

11. The method of claim 1, wherein the $R_3$ capping group is $CH_3$.

12. The method of claim 1, wherein $R_3$ is $R_1$.

13. The method of claim 1, wherein $R_2$ is a polyalkylene oxide.

14. The method of claim 13, wherein the polyalkylene oxide is selected from the group consisting of polyethylene glycol and polypropylene glycol.

15. The method of claim 14, wherein said polyalkylene oxide is a polyethylene glycol.

16. The method of claim 1, wherein the substantially non-antigenic polymer has a weight average molecular weight from about 200 to about 100,000 Daltons.

17. The method of claim 16, wherein the substantially non-antigenic polymer has a weight average molecular weight from about 2,000 to about 48,000 Daltons.

18. The method of claim 1, wherein the compound of formula (I) is:

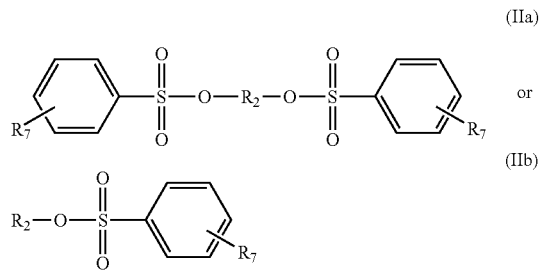

wherein $R_2$ is a polyalkylene oxide; and $R_7$ is methyl, halogen, nitro, fluoromethyl, difluoromethyl, trifluromethyl, or substituted carboxyl.

19. The method of claim 18, wherein $R_2$ is a polyethylene glycol and $R_7$ is methyl.

20. The method of claim 1, wherein the purity of the polymer containing the terminal amine formed by said process is greater than about 95%.

21. The method of claim 20, wherein the purity of the polymer containing the terminal amine formed by said process is greater than 98%.

22. The meted of claim 21, wherein the purity of the polymer containing said terminal amine formed by said process is greater than 99%.

* * * * *